(12) United States Patent
Hori et al.

(10) Patent No.: US 11,311,963 B2
(45) Date of Patent: Apr. 26, 2022

(54) METHOD FOR PRODUCING LIQUID-COOLED JACKET

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 172 days.

(21) Appl. No.: 16/624,263

(22) PCT Filed: Nov. 16, 2017

(86) PCT No.: PCT/JP2017/041189
§ 371 (c)(1),
(2) Date: Dec. 18, 2019

(87) PCT Pub. No.: WO2019/064613
PCT Pub. Date: Apr. 4, 2019

(65) Prior Publication Data
US 2021/0146474 A1 May 20, 2021

(30) Foreign Application Priority Data

Sep. 28, 2017 (JP) .............................. JP2017-187346

(51) Int. Cl.
*B23K 20/00* (2006.01)
*B23K 20/12* (2006.01)
*B23K 101/04* (2006.01)

(52) U.S. Cl.
CPC ...... *B23K 20/1265* (2013.01); *B23K 2101/04* (2018.08)

(58) Field of Classification Search
CPC .............. B23K 20/1255; B23K 20/126; B23K 2101/14; B23K 20/122; B23K 20/1265;
(Continued)

(56) References Cited

U.S. PATENT DOCUMENTS 7,275,675 B1 * 10/2007 Carter ................ B23K 20/1255
228/112.1
7,494,040 B2 * 2/2009 Babb .................. B23K 20/1225
228/2.1
(Continued)

FOREIGN PATENT DOCUMENTS

CN 102317027 A 1/2012
CN 103537793 A 1/2014
(Continued)

OTHER PUBLICATIONS

International Search Report for No. PCT/JP2017/041189, dated Feb. 13, 2018.

*Primary Examiner* — Erin B Saad
(74) *Attorney, Agent, or Firm* — Merchant & Gould P.C.

(57) ABSTRACT

The method comprises a primary joining process in which primary joining is performed by friction stirring by moving a rotary tool (F) once around a recessed part (13) along a first overlap part (H1) in a state where only a stirring pin (F2) of the rotary tool provided with the stirring pin is inserted in the first overlap part (H1) from a front surface (3b) of a sealing body (3) and is in contact with a jacket body (2) and the sealing body (3). In the primary joining process, the rotary tool (F), which is provided with a flat surface (F4) orthogonal to a rotational axis of the stirring pin (F2) and a projection (F5) projecting from the flat surface (F4) at a tip part of the stirring pin (F2), is employed, and the first overlap part (H1) is joined by bringing the flat surface (F4) into contact with only the sealing body (3) and inserting a tip end of the projection (F5) more deeply than the first overlap part (H1).

14 Claims, 9 Drawing Sheets (58) Field of Classification Search
CPC ............ B23K 20/129; B23K 2101/045; B23K 2103/10; B23K 20/1225; B23K 20/1235; B23K 20/123; B23K 20/124; B23K 2101/36; B23K 20/12; B23K 20/2336; B23K 2101/04; B23K 2101/18; B23K 2103/18; B23K 20/1245; B23K 20/127; B23K 20/227; B23K 20/24; B23K 2101/06; B23K 2103/05; B23K 31/125; B23K 33/006; B23K 37/0235; B23K 37/0531

See application file for complete search history.

(56) References Cited

U.S. PATENT DOCUMENTS

| | | | |
|---|---|---|---|
| 8,434,661 B2 * | 5/2013 | Hovanski | B23K 20/1255 228/112.1 |
| 11,059,125 B2 * | 7/2021 | Rosal | B23K 20/1255 |
| 2007/0241163 A1 * | 10/2007 | Valant | B23K 20/1255 228/2.1 |
| 2008/0154423 A1 * | 6/2008 | Badarinarayan | B23K 20/123 700/175 |
| 2009/0072007 A1 | 3/2009 | Nagano | |
| 2010/0282822 A1 | 11/2010 | Nagano | |
| 2011/0308059 A1 | 12/2011 | Seo et al. | |
| 2014/0165399 A1 | 6/2014 | Seo et al. | |
| 2018/0250767 A1 | 9/2018 | Hori et al. | |

FOREIGN PATENT DOCUMENTS

| | | |
|---|---|---|
| JP | 2010-137268 A | 6/2010 |
| JP | 2017-42817 A | 3/2017 |
| KR | 10-2011-0124286 A | 11/2011 |
| KR | 10-2013-0041345 A | 4/2013 |
| WO | 2007/119343 A1 | 10/2007 |
| WO | 2010/095335 A1 | 8/2010 |
| WO | 2017/033849 A1 | 3/2017 |
| WO | 2017/033923 A1 | 3/2017 |

* cited by examiner

METHOD FOR PRODUCING LIQUID-COOLED JACKET

This application is a National Stage Application of PCT/JP2017/041189, filed Nov. 16, 2017, which claims benefit of priority to Japanese Patent Application No. 2017-187346, filed Sep. 28, 2017, which applications are incorporated herein by reference. To the extent appropriate, a claim of priority is made to each of the above disclosed applications.

TECHNICAL FIELD

The present invention relates to a method for manufacturing a liquid-cooling jacket.

BACKGROUND ART

As a conventional method for manufacturing a liquid-cooling jacket, Patent Document 1 discloses a technique of joining metal members together by friction stirring. In the conventional method for manufacturing a liquid-cooling jacket, a jacket body having a bottom part and a peripheral wall part which stands on the periphery of the bottom part to form a frame-like wall, and a sealing body to seal the recessed part of the jacket body are prepared. And then, friction stir welding is performed to an overlap part at which the jacket body and the sealing body overlap with each other. In the joining process, friction stir welding is performed after a rotary tool being rotated is inserted from a front surface of the sealing body.

PRIOR ART DOCUMENT

Patent Document

Patent Document 1: JP 2010-137268 A

SUMMARY OF THE INVENTION

Problem to be Solved by the Invention

By the way, it is desired that the overlap part of the jacket body and the sealing body is reliably joined as much as possible.

From such a point of view, an object of the present invention is to provide a method for manufacturing a liquid-cooling jacket, the method being capable of reliably joining the overlap part of the jacket body and the sealing body.

Means for Solving the Problem

In order to solve the problem, the present invention is characterized by a method for manufacturing a liquid-cooling jacket, the liquid-cooling jacket including: a jacket body having a bottom part and a frame-like peripheral wall part standing on a periphery of the bottom part; and a sealing body to seal a recessed part of the jacket body, the jacket body and the sealing body together defining a hollow part in which heat transport fluid flows, the method comprising: an overlapping process in which the sealing body is placed on an end surface of the peripheral wall part in such a way that the end surface and a back surface of the sealing body are overlapped each other to form a first overlap part; and a primary joining process in which primary joining is performed by friction stirring, the primary joining process including inserting only a stirring pin provided to a rotary tool in the first overlap part from a front surface of the sealing body and moving the rotary tool once around the recessed part along the first overlap part in a state where only the stirring pin is in contact with the jacket body and the sealing body, wherein in the primary joining process, the rotary tool, which is provided with a flat surface orthogonal to a rotational axis of the stirring pin and a projection projecting from the flat surface at a tip part of the stirring pin, is employed, and the first overlap part is joined in a state where the flat surface is in contact with only the sealing body and a tip end of the projection is inserted more deeply than the first overlap part.

According to the present invention, plastically fluidized material, which is generated by friction stirring performed along the projection and is whirled up by the projection, is held by the flat surface. Thereby, friction stirring can be surely performed to a zone around the projection, and an oxide film of the first overlap part is surely divided. Therefore, the joining strength of the first overlap part can be enhanced.

Furthermore, since only the projection is inserted more deeply than the first overlap part, a width of the plasticized region due to friction stirring can be made smaller in comparison with a case where the flat surface is inserted more deeply than the first overlap part. Thereby, plastically fluidized material can be prevented from flowing into the recessed part of the jacket body.

Further, it is preferable that a support part is provided on either the bottom part of the jacket body or the back surface of the sealing body and comes into contact with the other.

According to this invention, the strength of the liquid-cooling jacket can be enhanced by the support part.

Furthermore, it is preferable that the jacket body is provided with a support part standing on the bottom part and to come into contact with the back surface of the sealing body, and in the primary joining process, in addition to friction stir welding to the first overlap part, friction stir welding is performed also to a second overlap part where the back surface of the sealing body and an end surface of the support part are overlapped each other.

According to this invention, the joining strength between the jacket body and the sealing body can be enhanced since friction stir welding is performed to also the second overlap part.

Furthermore, it is preferable that in the primary joining process, the second overlap part is joined in a state where the flat surface is in contact with only the sealing body and a tip end of the projection is inserted more deeply than the second overlap part.

According to this invention, plastically fluidized material, which is generated by friction stirring along the projection and is whirled up by the projection, is held by the flat surface. Thereby, friction stirring around the projection can be more surely performed, and the oxide film of the second overlap part is surely divided. Therefore, the joining strength of the second overlap part can be enhanced.

Further, since only the projection is inserted more deeply than the second overlap part, a width of the plasticized region due to friction stirring can be made smaller in comparison with a case where the flat surface is inserted more deeply than the second overlap part. Thereby, the plastically fluidized material can be prevented from flowing into the recessed part of the jacket body.

It is preferable that the support part is formed continuously with the peripheral wall part, and in the primary joining process, friction stir welding is performed to the first overlap part and to the second overlap part continuously.

According to this invention, since friction stir welding can be performed to the first overlap part and to the second overlap part continuously, a liquid-cooling jacket having high deformation-resistance can be manufactured and a production cycle can be improved.

Furthermore, it is preferable that the support part is formed continuously with one wall part of the peripheral wall part and apart from another wall part facing the one wall part, and in the primary joining process, the rotary tool is inserted in the front surface of the sealing body at a position corresponding to the support part, then friction stir welding is performed to the second overlap part and to the first overlap part continuously, and then the rotary tool is pulled out from the sealing body at an outer position than a plasticized region generated in the first overlap part.

According to this invention, friction stir welding can be performed to the first overlap part and to the second overlap part continuously. Therefore, a liquid-cooling jacket having high deformation-resistance can be manufactured and a production cycle can be improved. Furthermore, if the rotary tool is moved inward from the plasticized region, there is a concern that metal material flows out from the second overlap part and the first overlap part formed by the peripheral wall part and the sealing body. However, since the rotary tool is moved outward from the plasticized region to be pulled out at the position, such a problem can be resolved.

Furthermore, it is preferable that the jacket body is provided with a support part standing on the bottom part and to come into contact with the back surface of the sealing body, the support part having a projection part on an end surface of the support part, wherein the sealing body is provided with a hole part in which the projection part is inserted, wherein in the overlapping process, the projection part is inserted in the hole part in such a way that a hole wall of the hole part and a side surface of the projection part are butted against each other to form a butting part and a second overlap part where the back surface of the sealing body and the end surface of the support part are overlapped each other, and wherein in the primary joining process, in addition to friction stir welding to the first overlap part, friction stir welding is performed also to the second overlap part where the back surface of the sealing body and the end surface of the support part are overlapped each other and to the butting part where the hole wall of the hole part of the sealing body and the side surface of the projection part of the support part are butted against each other.

According to this invention, in the overlapping process, since the projection part formed on the end surface of the support part is inserted in the hole part of the sealing body, it can be easily done to attach the sealing body onto the support part to fix the position. Furthermore, in the primary joining process, since friction stir welding can be performed also to the butting part at which the hole wall of the hole part and the side surface of the projection part are butted against each other, the joining strength between the jacket body and the sealing body can be enhanced.

Further, it is preferable that in the primary joining process, regarding friction stir welding to the butting part, the second overlap part and the butting part are each joined in a state where the flat surface is in contact with both of the jacket body and the sealing body, and the tip end of the projection is inserted more deeply than the second overlap part.

According to this invention, plastically fluidized material whirled up by the projection is held by the flat surface. Thereby, oxide films of the second overlap part and the butting part can be surely divided, so that the joining strength can be enhanced.

It is preferable that a repairing process in which a pull-up trace of the rotary tool is repaired by filling the pull-up trace with weld metal, the pull-up trace remaining on the front surface of the sealing body, is further comprised.

According to this invention, since the pull-up trace of the rotary tool disappears, the surface of the liquid-cooling jacket can be flatly finished.

It is preferable that in the primary joining process, a cooling plate is provided on the bottom part of the jacket body, and friction stir welding is performed while cooling the jacket body and the sealing body.

According to this invention, since friction heat can be reduced, the deformation of the liquid-cooling jacket due to thermal contraction can be reduced.

It is preferable that a cooling path of the cooling plate, along which a cooling medium flows, has a plane shape at least along a moving locus of the rotary tool.

According to this invention, since a portion to which friction stirring is performed can be cooled intensively, cooling efficiency can be enhanced.

Furthermore, it is preferable that a cooling path of the cooling plate, along which a cooling medium flows, is composed of a cooling pipe embedded in the cooling plate.

According to this invention, the management of the cooling medium can be easily done.

Further, it is preferable that in the primary joining process, friction stir welding is performed while letting a cooling medium flow in the inside of the jacket body to cool the jacket body and the sealing body.

According to this invention, since friction heat can be reduced, the deformation of the liquid-cooling jacket due to thermal contraction can be reduced. Furthermore, cooling can be done with the use of the jacket body itself without the use of the cooling plate or the like.

A method for manufacturing a liquid-cooling jacket according to any one of claim 10.

And then, it is preferable that a plurality of fins are provided on at least either the bottom part of the jacket body or the back surface of the sealing body.

According to this invention, the liquid-cooling jacket having high cooling efficiency can be manufactured.

Effect of the Invention

According to the present invention, there can be provided a method for manufacturing a liquid-cooling jacket, the method being capable of reliably joining the overlap part of the jacket body and the sealing body.

MODE FOR CARRYING OUT THE INVENTION

First Embodiment

Figure 1:
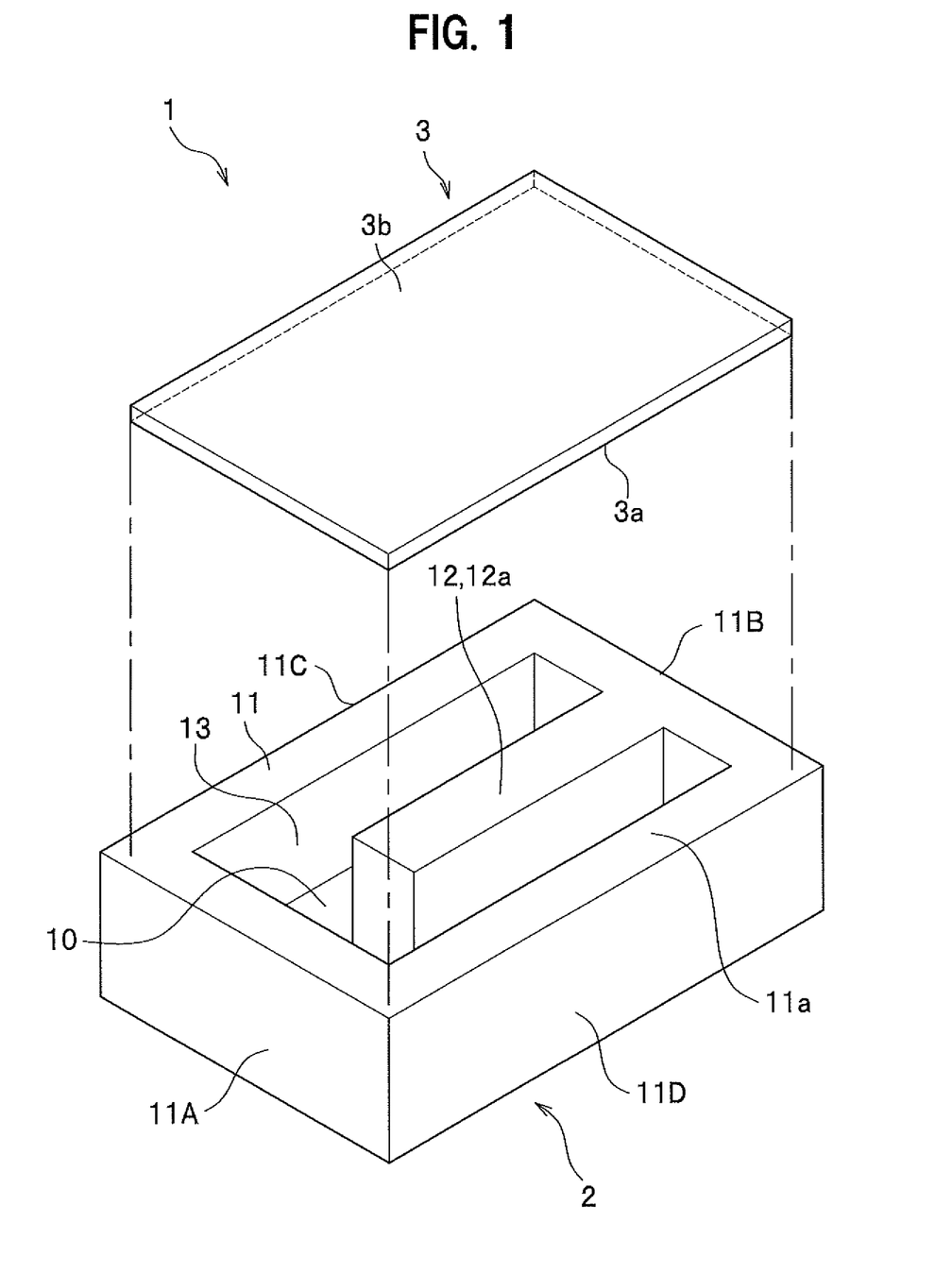
FIG. 1 is an exploded perspective view showing a liquid-cooling jacket according to a first embodiment of the present invention.

As shown in FIG. 1, a first embodiment of the present invention is a method for manufacturing a liquid-cooling jacket 1 in a hollow part of which heat transport fluid flows, the hollow part being defined by a jacket body 2 and a sealing body 3. Note that, "a front surface" in the following description means a surface opposite to "a back surface".

First, structures of the jacket body 2 and the sealing body 3 will be explained. The jacket body 2 is a box-shaped body opening upward. The jacket body 2 is formed by including a bottom part 10, a frame-like peripheral wall part 11 standing on the periphery of the bottom part 10, and a support part 12. The jacket body 2 is made of metal appropriately selected from among metals, to which friction stirring is capable of being performed, such as aluminum, an aluminum alloy, copper, a copper alloy, titanium, a titanium alloy, magnesium, a magnesium alloy. For example, an aluminum alloy casting material (for example, JIS ADC12 or the like) forged by die-casting may be used. The peripheral wall part 11 is composed of wall parts 11A, 11B, 11C, 11D which each have the same plate thickness. The wall parts 11A, 11B are short side parts facing each other. The wall parts 11C, 11D are long side parts facing each other. In the space surrounded by the bottom wall part 10 and the peripheral wall part 11, a recessed part 13 is formed.

The support part 12 stands on the bottom part 10 and has a shape of a rectangular parallelepiped. And the support part 12 is continuous with the wall part 11B and extended toward the wall part 11A. There is a prescribed distance between a front end of the support part 12 and the wall part 11A facing the wall part 11B. An end surface 12a of the support part 12 and an end surface 11a of the peripheral wall part 11 are flush with each other.

The sealing body 3 is a plate-like member having a rectangular shape in a plan view. Sizes of length and breadth of the sealing body 3 in a plan view are a bit smaller than sizes of length and breadth of the jacket body 2 in a plan view. The sealing body 3 is made of metal appropriately selected from among metals, to which friction stirring is capable of being performed, such as aluminum, an aluminum alloy, copper, a copper alloy, titanium, a titanium alloy, magnesium, a magnesium alloy. For example, an aluminum alloy material (for example, JIS A6063 or the like) made by extrusion may be used.

Next, a method for manufacturing the liquid-cooling jacket according to the first embodiment of the present invention will be explained. In the method for manufacturing the liquid-cooling jacket, a preparation process, an overlapping process, a fixing process, a provisional joining process, a primary joining process, and a deburring process are performed.

The preparation process is a process to prepare the jacket body 2 and the sealing body 3 shown in FIG. 1.

Figure 2:
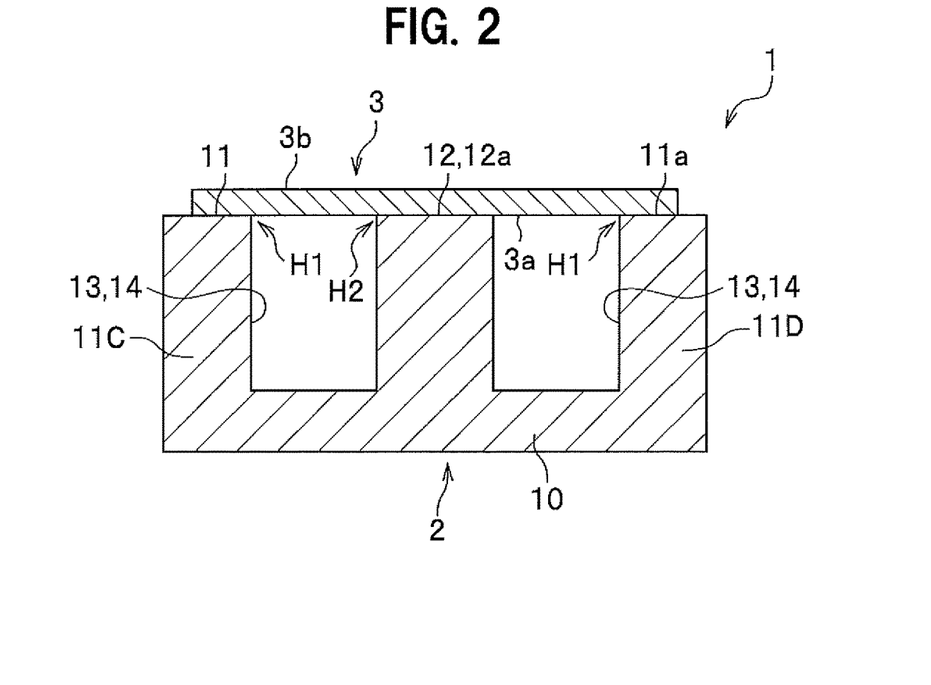
FIG. 2 is a sectional view showing an overlapping process of a method for manufacturing the liquid-cooling jacket according to the first embodiment of the present invention.

As shown in FIG. 2, the overlapping process is a process in which the sealing body 3 is put on the jacket body 2. That is, with a back surface 3a of the sealing body 3 facing the underside and a front surface 3b thereof facing the upper side, the sealing body 3 is put on the jacket body 2. Thus, a first overlap part H1 is formed by overlapping the back surface 3a of the sealing body 3 and the end surface 11a of the peripheral wall part 11 with each other. The first overlap part H1 has a rectangular frame shape in a plan view. Furthermore, a second overlap part H2 is formed by overlapping the back surface 3a of the sealing body 3 and the end surface 12a of the support part 12 with each other. The second overlap part H2 is straight.

The fixing process is a process in which the jacket body 2 and the sealing body 3 are fixed to a fixing member (not shown) such as a table. The jacket body 2 and the sealing body 3 are fastened to a table or the like not to move by means of a fixture such as a clamp.

The provisional joining process is a process in which the jacket body 2 and the sealing body 3 are provisionally joined. The provisional joining process can be performed by performing spot joining to the first overlap part H1 at an inner corner defined by the end surface 11a and a side surface of the sealing body 3. The spot joining may be performed by friction stirring or welding. Furthermore, the provisional joining process can be omitted.

As shown in FIGS. 3 to 6, the primary joining process is a process in which the jacket body 2 and the sealing body 3 are joined together by friction stirring with the use of a rotary tool F. In the present embodiment, the primary joining process includes a second overlap part joining process in which friction stir welding is performed to the second overlap part H2 and a first overlap part joining process in which friction stir welding is performed to the first overlap part H1.

Figure 4:
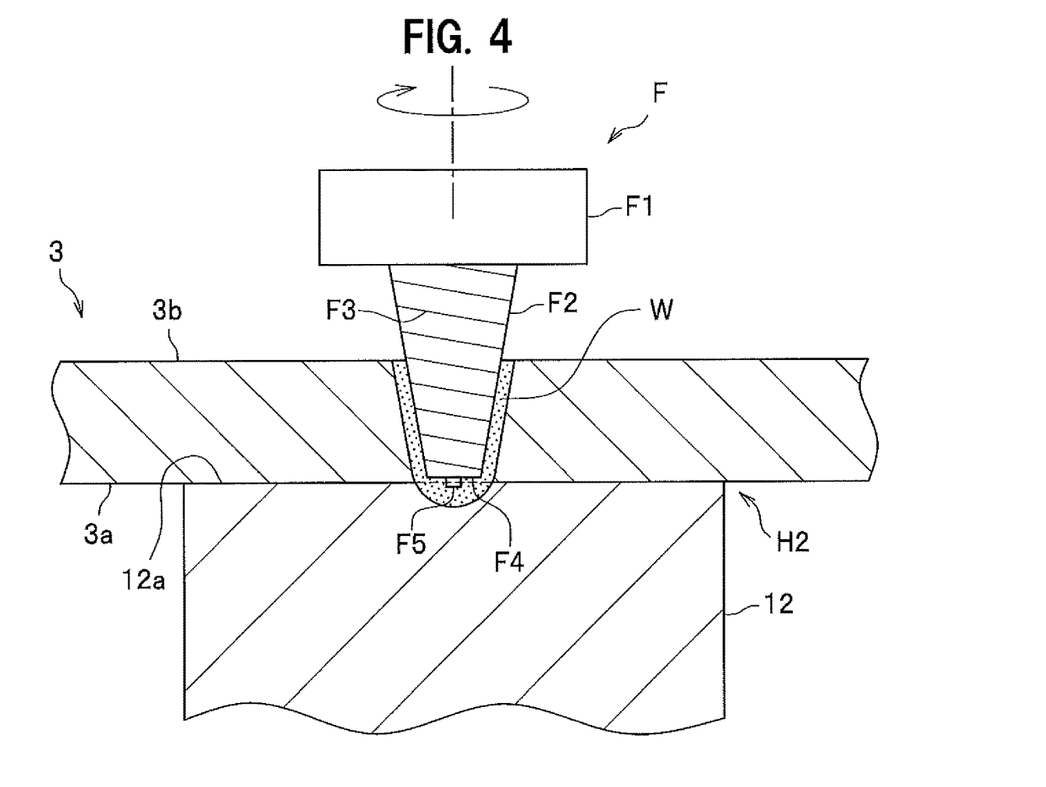
FIG. 4 is a sectional view taken along the line I-I of FIG. 3.

First, the rotary tool F to be used in the primary joining process will be explained. As shown in FIG. 4, the rotary tool F has a connecting part F1 and a stirring pin F2. The stirring pin F2 hangs down from the connecting part F1 and is coaxial with the connecting part F1. The stirring pin F2 has a shape which becomes smaller from the connecting part F1 toward the tip part of the stirring pin. The stirring pin F2 has a length greater than a plate thickness of the sealing body 3. A spiral groove F3 is formed on the outer surface of the stirring pin F2. In this embodiment, the spiral groove F3 is formed counterclockwise from the base end toward the tip part for rotating the rotary tool F clockwise.

Note that, in a case where the rotary tool F is rotated counterclockwise, it is preferable that the spiral groove F3 is formed clockwise from the base end toward the tip part. By designing the spiral groove F3 in such a manner, plastically fluidized metal during friction stirring is led toward the tip part of the stirring pin F2 by the spiral groove F3. Thereby, the amount of metal to leak to the outside of the sealing body 3 can be reduced.

Furthermore, the stirring pin F2 has a flat surface F4 and a projection F5. The flat surface F4 is a flat surface which is orthogonal to the rotational axis. The projection F5 is a part projecting from the flat surface F4 and has a cylindrical shape in this embodiment, but the shape of the projection F5 is not limited to that shape. A stepping part is formed by the flat surface F4 and the side surface of the projection F5.

Figure 3:
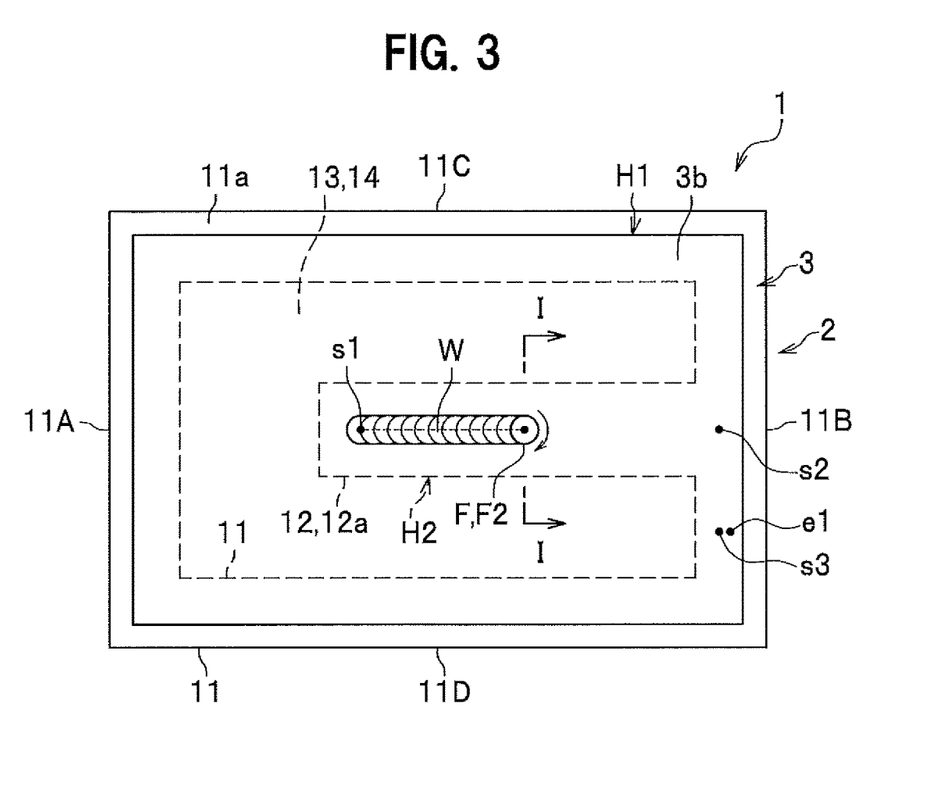
FIG. 3 is a plan view showing a primary joining process of the method for manufacturing the liquid-cooling jacket according to the first embodiment of the present invention.

In the second overlap part joining process, as shown in FIG. 3, the stirring pin F2 of the rotary tool F being rotated clockwise is inserted in the front surface 3b of the sealing body 3 at a start point s1 which is set at a position corresponding to a front end portion of the support part 12 (front end portion on the wall part 11A side). In the second overlap part joining process, as shown in FIG. 4, friction stir welding is performed in a state where the connecting part F1 is away from the sealing body 3, that is, the base end side of the stirring pin F2 is exposed. An insertion depth of the stirring pin F2 is set so that the flat surface F4 comes into contact with only the sealing body 3 and the tip end of the projection F5 is located at a position deeper than the second overlap part H2 (end surface 12a). And the rotary tool F is moved along the second overlap part H2 while being kept at the constant height. That is, the rotary tool F is moved in a longitudinal direction of the support part 12.

By the second part joining process, friction stirring is performed to the back surface 3a of the sealing body 3 and the end surface 12a of the support part 12 to be joined together. Furthermore, a plasticized region W is generated along a movement locus of the rotary tool F.

Figure 5:
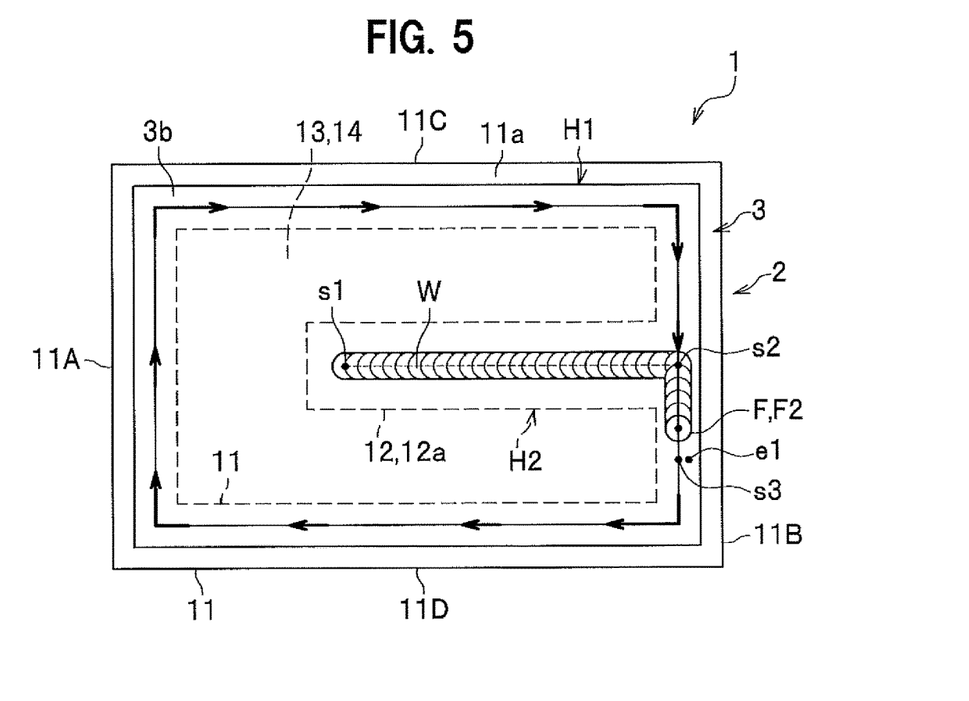
FIG. 5 is a plan view showing the primary joining process of the method for manufacturing the liquid-cooling jacket according to the first embodiment of the present invention.

When the rotary tool F is moved up to a first middle point s2 which is set in the first overlap part H1, The process proceeds to the first overlap part joining process without pulling out the rotary tool F. As shown in FIG. 5, in the first overlap part joining process, the rotary tool F is moved along the first overlap part H1. That is, the rotary tool F is moved once clockwise around the recessed part 13 along the peripheral wall part 11 as shown by arrows.

In the first overlap part joining process, similarly to the second overlap part joining process, friction stir welding is performed in a state where the connecting part F1 is away from the sealing body 3, that is, the base end side of the stirring pin F2 is exposed. An insertion depth of the stirring pin F2 is also set similarly to the second overlap part joining process so that the flat surface F4 comes into contact with only the sealing body 3 and the tip end of the projection F5 is located at a position deeper than the first overlap part H1 (end surface 11a). And the rotary tool F is moved along the first overlap part H1 while being kept at the constant height.

Note that, the insertion depth of the rotary tool F need not necessarily be kept constant. For example, the insertion depth may be changed between the first overlap part joining process and the second overlap part joining process. Since the rotary tool F is not provided with a shoulder part, the insertion depth can be easily changed.

In the primary joining process, it is preferable that joining conditions are set so that burrs are generated at a position having a distance from the recessed part 13. The position where burrs are generated varies in accordance with joining conditions. The joining conditions are determined by each element of a rotational speed of the rotary tool F, a rotational direction of the rotary tool F, a movement speed (feed speed) of the rotary tool F, an advancing direction of the rotary tool F, an inclination angle (tapered angle) of the stirring pin F2, materials of metal members (the jacket body 2 and the sealing body 3) to be joined, thicknesses of the metal members to be joined, and so on, and a combination of these elements.

For example, in a case where the rotational speed of the rotary tool F is low, the temperature of the plastically fluidized material on a shear side easily becomes higher than that on a flow side. The flow side is a retreating side, that is, a side that the movement speed of the rotary tool F is subtracted from a tangential speed of the outer surface of the rotary tool F. The shear side is an advancing side, that is, a side that the movement speed of the rotary tool F is added to the tangential speed of the outer surface of the rotary tool F. Therefore, many burrs tend to be generated on the shear side at a position which is outside the plasticized region. On the other hand, for example, in a case where the rotational speed of the rotary tool F is high, the temperature of the plastically fluidized material on the shear side rises more, but many burrs tend to be generated on the flow side at a position which is outside the plasticized region as much as the rotational speed is high.

In this embodiment, since the rotational speed of the rotary tool F is set to be low, in the friction stir welding to the first overlap part H1, many burrs tend to be generated at a position having a distance from the recessed part 13, the position being on the shear side and outside the plasticized region W. Note that, joining conditions of the rotary tool F are not limited to those already explained, and can be appropriately set.

Thus, in a case where joining conditions are set so that burrs or many burrs are generated at a position having a distance from the recessed part 13, burrs V can be concentrated to a position having a distance from the recessed part 13. Therefore, that is preferable since a deburring process to be described later can be easily performed.

As shown in FIG. 5, after the rotary tool F is moved by one round along the first overlap part H1 as shown by arrows, it is moved via the first middle point s2 up to a second middle point s3 as it is. Then, the rotary tool F is moved up to an end point e1 which is set to be an outer position than the second middle point s3 within the front surface 3b of the sealing body 3. And then, the rotary tool F is pulled upward to be removed from the sealing body 3.

After the rotary tool F is removed from the sealing body 3, in a case where there remains a pull-up trace on the front surface 3b, a repairing process in which the pull-up trace is repaired may be performed. In the repairing process, for example, the pull-up trace can be repaired by performing build-up welding to fill the pull-up trace with weld metal. Thereby, the front surface 3b can be made flat.

The deburring process is a process in which burrs exposed on the front surface 3b of the sealing body 3 by performing the primary joining process are removed. In the deburring process, burrs are removed by using a cutting tool or the like. Thereby, the front surface 3b of the sealing body 3 can be finely finished.

Figure 6:
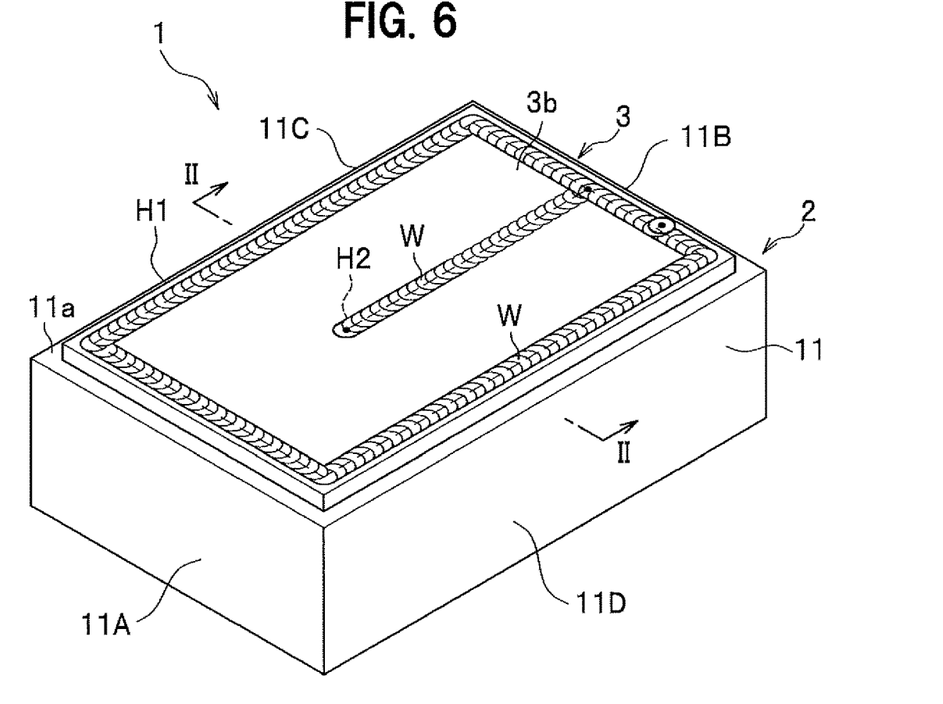
FIG. 6 is a perspective view showing the liquid-cooling jacket according to the first embodiment of the present invention.
Figure 7:
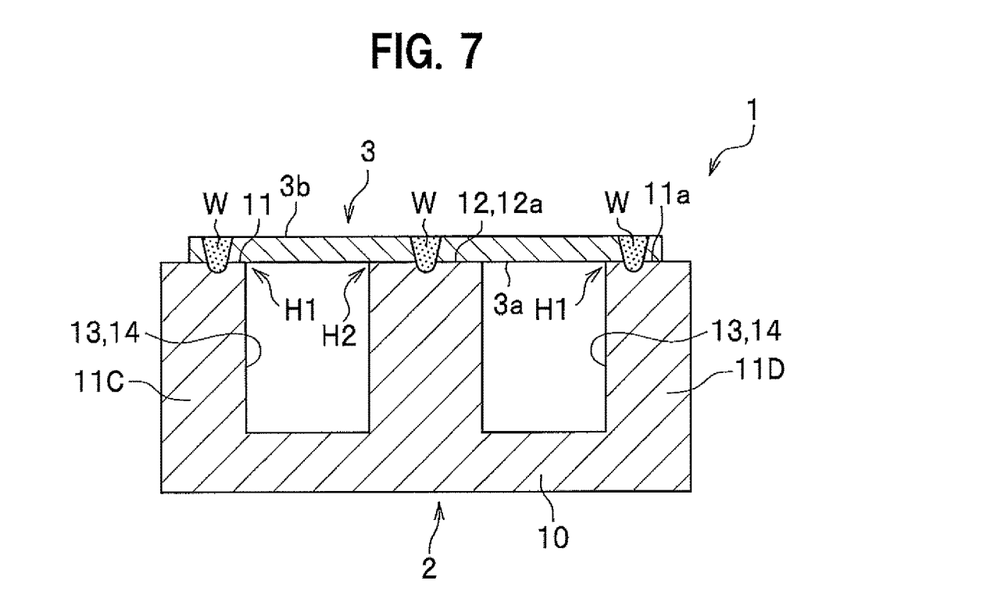
FIG. 7 is a sectional view taken along the line II-II of FIG. 6.

By way of the above processes, the liquid-cooling jacket 1 shown in FIGS. 6, 7 is manufactured.

As shown in FIGS. 6, 7, the liquid-cooling jacket 1 is manufactured by performing friction stirring to the jacket body 2 and the sealing body 3 to integrate them. In the liquid-cooling jacket 1, the first overlap part H1 where the back surface 3a of the sealing body 3 and the end surface 11a of the peripheral wall part 11 overlap with each other and the second overlap part H2 where the back surface 3a of the sealing body 3 and the end surface 12a of the support part 12 overlap with each other are continuously joined to each other by friction stirring. The plasticized region W is generated in a portion to which friction stirring is performed.

Inside the liquid-cooling jacket 1, a hollow part 14, in which heat transport fluid that transports heat to the outside flows, is formed.

By the method for manufacturing a liquid-cooling jacket according to the first embodiment described in the above, in the second overlap part joining process and in the first overlap part joining process, plastically fluidized material which is generated by friction stirring performed along the projection F5 of the stirring pin F2 and whirled up by the projection F5 is held by the flat surface F4. Thereby, friction stirring around the projection F5 can be more surely performed, and the oxide films of the first overlap part H1 and the second overlap part H2 are surely divided. Therefore, the joining strength of the first overlap part H1 and that of the second overlap part H2 can be enhanced.

And, in a case where only the projection 5 is inserted more deeply than the first overlap part H1 and the second overlap part H2, the width of the plasticized region W generated by friction stirring can be made smaller in comparison with a case where the flat surface F4 is inserted more deeply than the first overlap part H1 and the second overlap part H2. Thereby, the plastically fluidized material can be prevented from flowing into the recessed part 13 of the jacket body 2.

Furthermore, since the support part 12 which comes into contact with the sealing body 3 is provided on the bottom part 10 of the jacket body 2, the strength of the liquid-cooling jacket 1 can be enhanced by the support part 12. Note that, the support part 12 can be provided on the back surface 3a of the sealing body 3.

Note that, friction stir welding need not be performed to the second overlap part H2. However, in a case where friction stir welding is performed also to the second overlap part H2 like the present embodiment, joining strength between the jacket body 2 and the sealing body 3 can be more enhanced.

Still further, the support part 12 is formed continuously with the peripheral wall part 11, and in the primary joining process, friction stir welding is continuously performed to the first overlap part H1 and the second overlap part H2. Thanks to that, the liquid-cooling jacket 1 having high deformation-resistance can be manufactured, and a production cycle can be improved.

Furthermore, in a case where the rotary tool F is moved inward from the plasticized region W and is pulled out from that position after finishing friction stir welding to the first overlap part H1 and the second overlap part H2, there is a concern that metal material from the second overlap part H2 and the first overlap part H1 formed by the peripheral wall part 11 and the sealing body 3 flows into the inside. However, the primary joining process can resolve such a problem by pulling out the rotary tool F from the position to which the rotary tool F has been moved outward from the plasticized region W.

Still further, in a case where the repairing process, in which weld metal is buried in the pull-up trace of the rotary tool F remaining on the front surface 3b of the sealing body 3, is performed to repair the trace, the pull-up trace of the rotary tool F disappears, so that the surface of the liquid-cooling jacket 1 can be finished flatly.

Modified Example of First Embodiment

In the following modified example of the first embodiment and other embodiments, description of technical matters common to the first embodiment is omitted, and different matters are mainly described. Furthermore, each member similar to the first embodiment has the same symbol and is not described.

Figure 8:
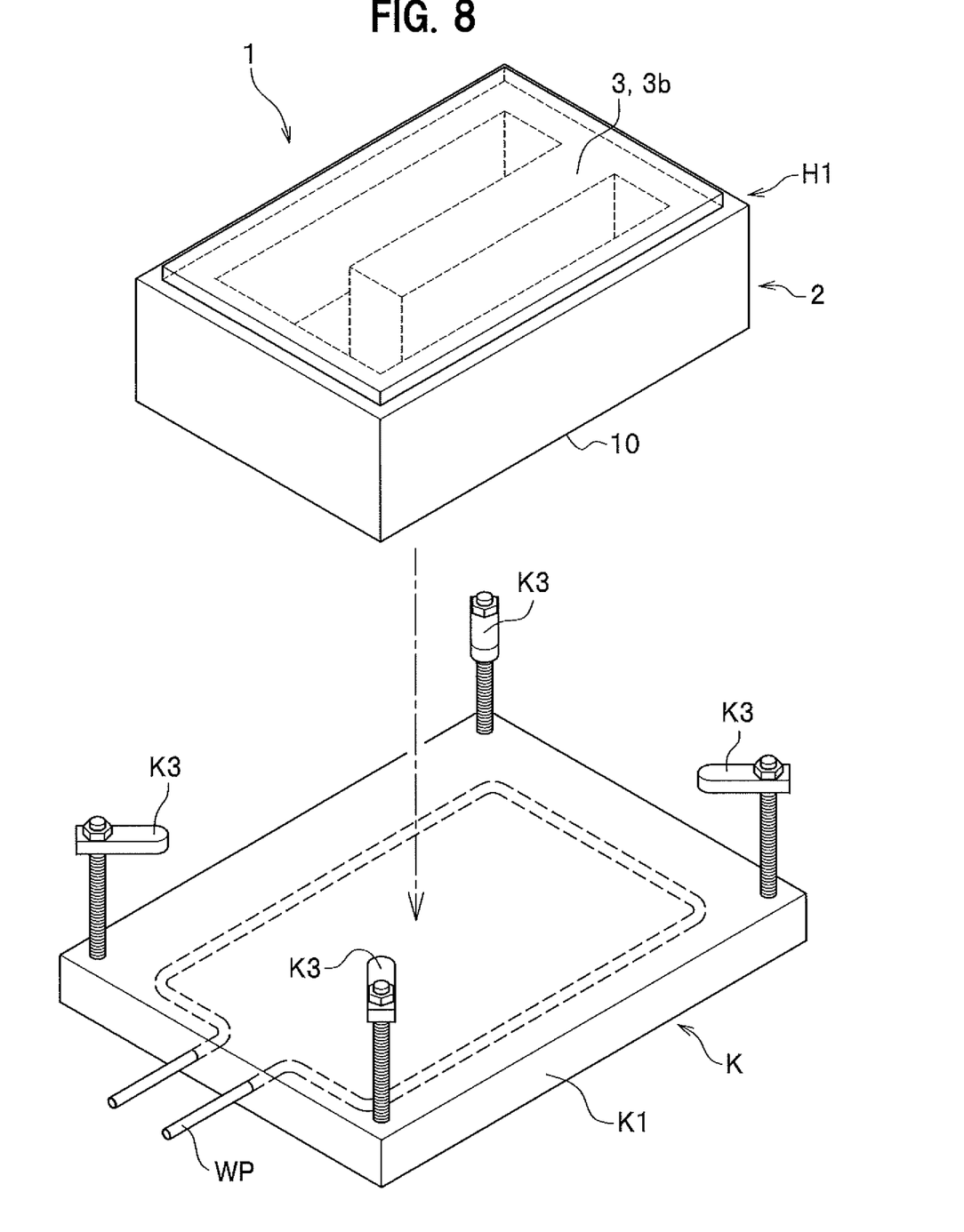
FIG. 8 is a perspective view showing a modified example of the method for manufacturing the liquid-cooling jacket according to the first embodiment.

Next, a modified example of the method for manufacturing the liquid-cooling jacket according to the first embodiment is described. As shown in FIG. 8, the modified example differs from the first embodiment in a point that the provisional joining process and the primary joining process are performed with the use of a cooling plate.

As shown in FIG. 8, in the modified example, when the fixing process mentioned in the above is performed, the jacket body 2 and the sealing body 3 are fixed to a table K. The table K is composed of a base plate K1 having a rectangular parallelepiped shape, clamps K3 provided at four corners of the base plate K1, and a cooling pipe WP provided inside the base plate K1. The table K holds the jacket body 2 so as not to be moved and is a member to function as "a cooling plate" of the present invention.

The cooling pipe WP is a tubular member embedded inside the base plate K1. A cooling medium for cooling the base plate K1 flows in the cooling pipe WP. The position of the cooling pipe WP to be disposed, that is, the shape of the cooling path along which the cooling medium flows is not limited. In the modified example, it is a plane shape along a moving locus of the rotary tool F in the first overlap part joining process. Namely, in a plan view, the cooling pipe WP is disposed so that the cooling pipe WP and the first overlap part H1 are nearly overlapped.

In the provisional joining process and the primary joining process of the modified example, after the jacket body 2 and the sealing body 3 are fixed to the table K, friction stir welding is performed while letting the cooling medium flow in the cooling pipe WP. Thereby, since friction heat at the time of performing friction stir welding can be reduced, the deformation of the liquid-cooling jacket 1 due to thermal contraction can be reduced. Furthermore, in the modified example, in a plan view, since the cooling path and the first overlap part H1 (the moving locus of the rotary tool F) are overlapped, a portion where friction heat is generated can be cooled intensively. Thereby, cooling efficiency can be improved. Still further, since the cooling medium is let to flow in the disposed cooling pipe WP, management of the cooling medium is easy. Furthermore, since the table K (cooling plate) and the jacket body 2 come into contact with each other face to face, cooling efficiency can be improved.

Note that, the cooling pipe WP may be provided at a position corresponding to the second overlap part H2. Furthermore, friction stir welding may be performed while letting the cooling medium flow also in the inside of the jacket body 2 together with the state that the jacket body 2 and the sealing body 3 are cooled with the use of the table K (cooling plate). In this way, friction heat can be reduced, so that the deformation of the liquid-cooling jacket 1 due to thermal contraction can be reduced. Still further, in a case where friction stir welding is performed while letting the cooling medium flow only in the inside of the jacket body 2, the liquid-cooling jacket can be cooled with the use of the jacket body 2 itself without any cooling plate or the like.

Second Embodiment

Figure 9:
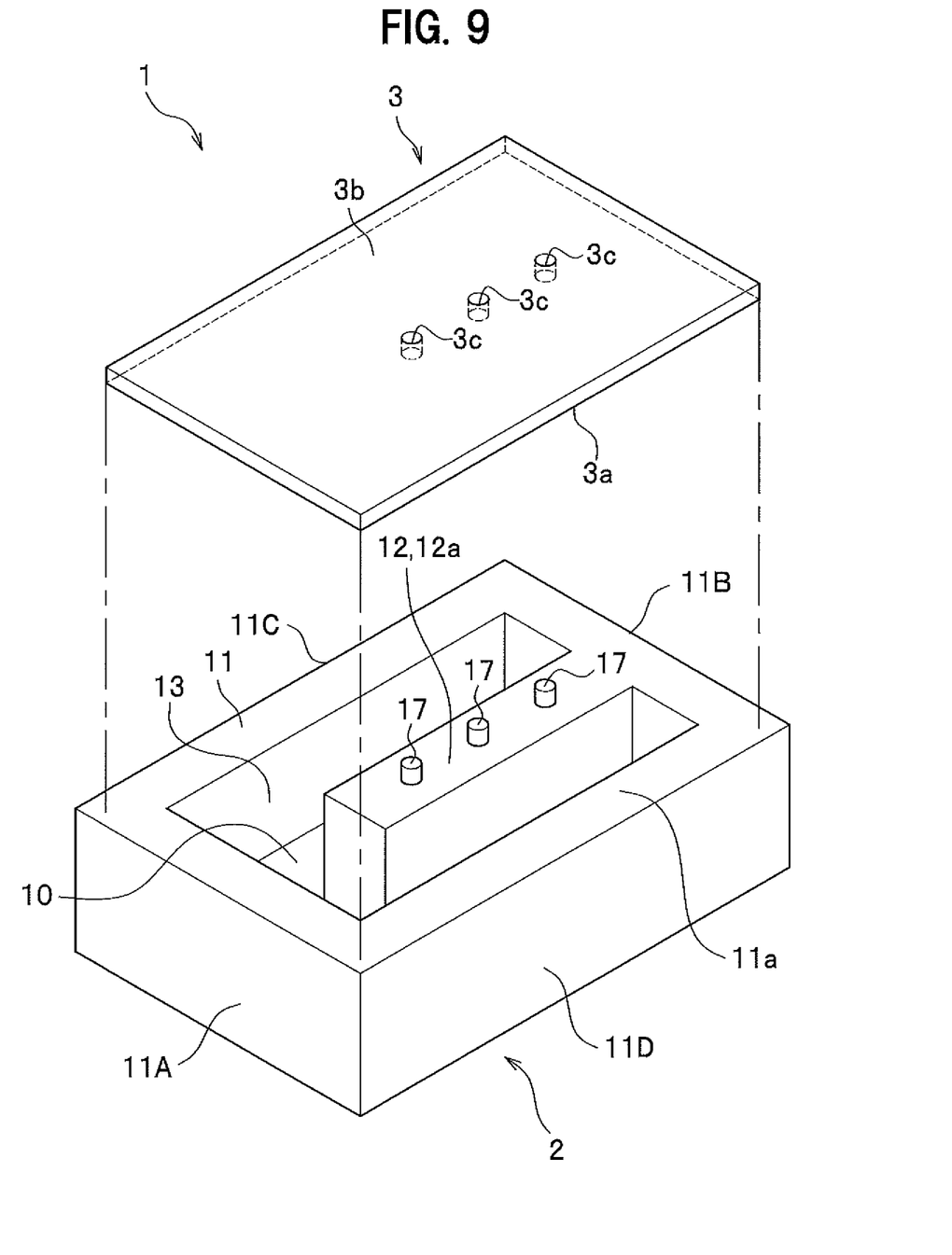
FIG. 9 is an exploded perspective view showing a liquid-cooling jacket according to a second embodiment of the present invention.

Next, a method for manufacturing a liquid-cooling jacket according to a second embodiment of the present invention is described. As shown in FIG. 9, the first one of differences between the second embodiment and the first embodiment is that three projection parts 17 are formed apart from each other on the end surface 12a of the support part 12. The shape of each projection part 17 is not limited in particular, and in this embodiment, each has a cylindrical shape. Furthermore, the number of the projection parts 17 is not limited in particular, and in this embodiment, the three are arranged in the longitudinal direction of the support part 12. Still further, three hole parts 3c, each of which has a circular shape in a plan view and passes through in the thickness direction of the sealing body 3, are formed in the sealing body 3. Each hole part 3c is a hole part in which one projection part 17 is inserted and is formed at a position corresponding to the one projection part 17. Each hole part 3c has a size that the one projection part 17 is inserted in almost without a gap.

In the second embodiment, in an overlapping process, each projection part 17 is inserted in the corresponding hole part 3c of the sealing body 3, so that a butting part H3, which is formed by the hole wall surface of a hole part 3c and the side surface of the projection part 17, is formed.

Figure 10:
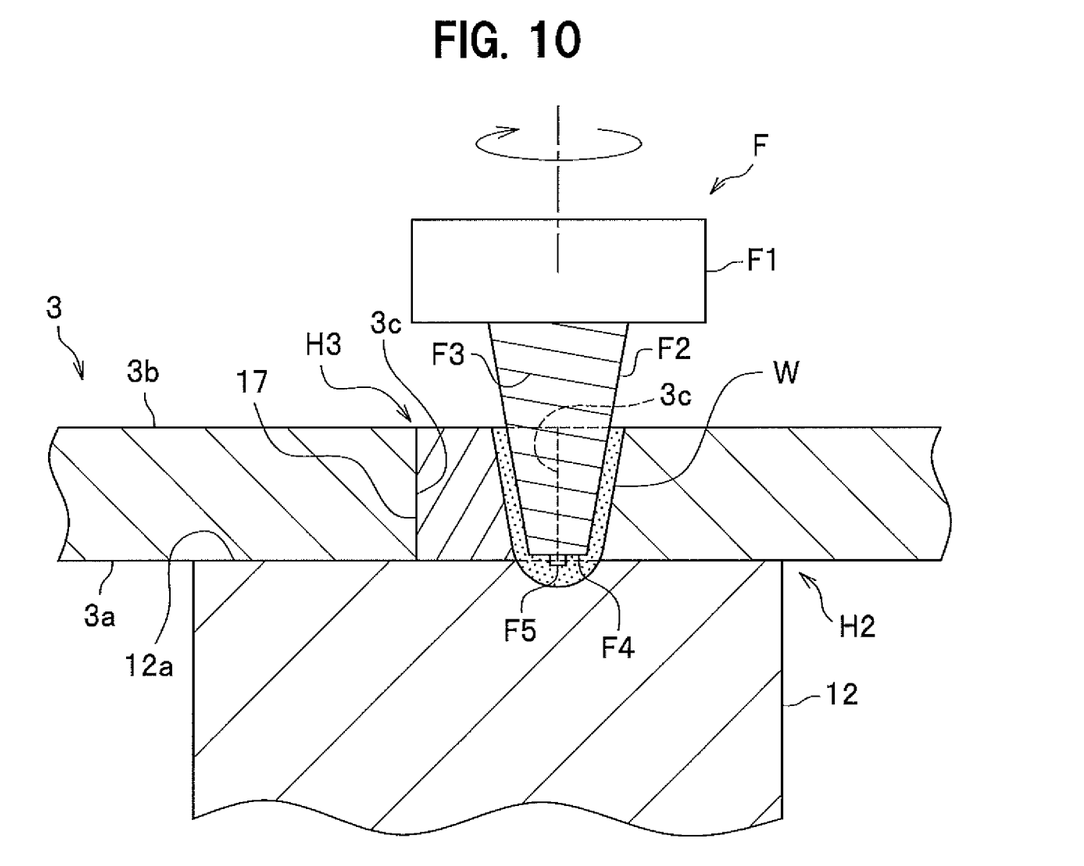
FIG. 10 is a longitudinal sectional view showing a primary joining process of a method for manufacturing the liquid-cooling jacket according to the second embodiment of the present invention.

And then, as shown in FIG. 10, in a primary joining process, three butting parts H3 are each joined by friction stirring in the second overlap part joining process. Since each butting part H3 has a circular shape in a plan view, the rotary tool F is moved along each butting part H3 so as to draw a circle in a plan view. Unlike the first embodiment, as to friction stir welding to each butting part H3, the insertion depth of the stirring pin F2 is set so that the flat surface F4 comes into contact with both of the jacket body 2 and the sealing body 3, and the tip end of the projection F5 is inserted more deeply than the second overlap part H2 (end surface 12a).

As apparent from the above description, the first overlap part joining process and the second overlap part joining process are not continuously performed. Note that, the insertion depth of the stirring pin F2 may be appropriately set.

Figure 11:
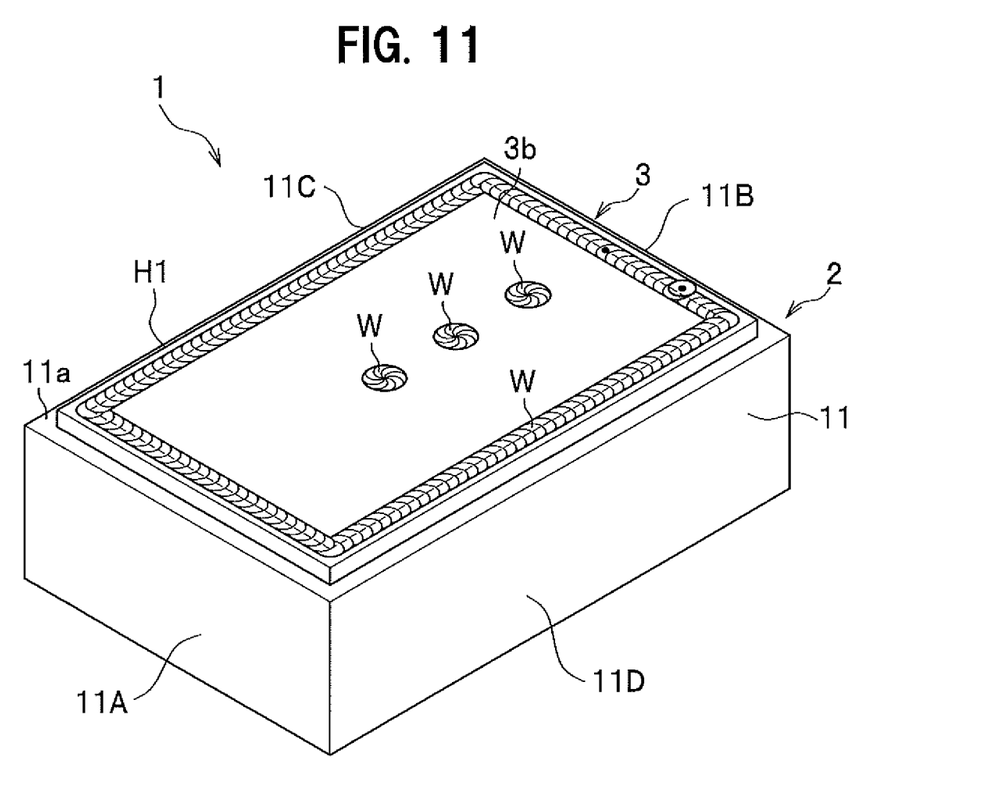
FIG. 11 is a perspective view showing the liquid-cooling jacket according to the second embodiment of the present invention.

FIG. 11 is a perspective view of the liquid-cooling jacket 1 completed via all processes in the second embodiment. The plasticized region W is generated by going along the outer periphery of the sealing body 3 by one round in a plan view by performing the first overlap part joining process. Furthermore, the three circular plasticized regions W arranged in the longitudinal direction on the support part 12 in a plan view are also generated by performing the second overlap part joining process.

According to this embodiment, in the primary joining process, friction stir welding can be performed also to each butting part H3 in which the hole wall surface of each hole part 3c and the side surface of each projection part 17 are butted against each other. Therefore, joining strength between the jacket body 2 and the sealing body 3 can be enhanced.

Furthermore, since the plastically fluidized material whirled up by the projection F5 is held by the flat surface F4, friction stirring can be surely performed to a zone around the projection F5. Thereby, oxide films of the second overlap part H2 and of the butting parts H3 are surely divided. Therefore, joining strengths of the second overlap part H2 and of the butting part H3 can be enhanced.

Third Embodiment

Figure 12:
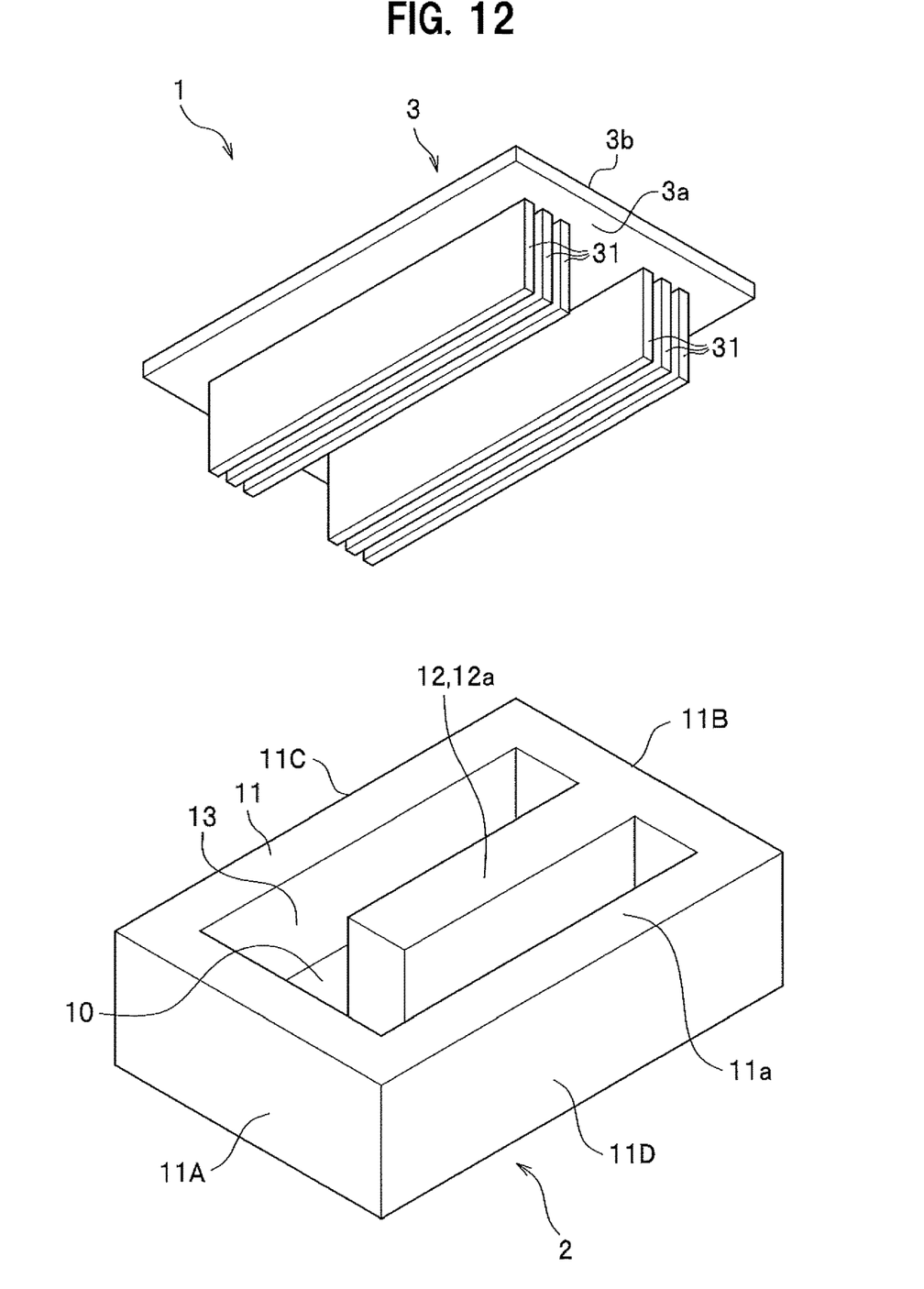
FIG. 12 is an exploded perspective view showing a liquid-cooling jacket according to a third embodiment of the present invention.

Next, a method for manufacturing a liquid-cooling jacket according to a third embodiment of the present invention is described. The third embodiment differs from the first embodiment on the point that fins 31 are provided on the sealing body 3 as shown in FIG. 12. That is, a plurality of fins 31 are provided on the back surface 3a of the sealing body 3. The jacket body 2 has the same structure as the first embodiment.

The plurality of fins 31 are hung vertically from the back surface 3a of the sealing body 3 with a prescribed distance between adjacent two among them. Each fin 31 is provided on the back surface 3a of the sealing body 3 so that the fins 31 are housed in the recessed part 13 of the jacket body 2 without interfering with the support part 12 when overlapping process is performed. Except using the sealing body 3 provided with the fins 31, each process of the first embodiment is similar to that of the third embodiment.

According to the method for manufacturing a liquid-cooling jacket according to the third embodiment, the liquid-cooling jacket 1 provided with the plurality of fins 31 can be manufactured. Since the liquid-cooling jacket 1 is provided with the fins 31, cooling efficiency can be improved. Note that the fins 31 may be provided on the bottom part 10 side of the jacket body 2.

DESCRIPTION OF THE SYMBOLS

1 Liquid-cooling jacket
2 Jacket body
3 Sealing body
3a Back surface
10 Bottom part
11 Peripheral wall part
11a End surface
11A Another wall part
11B One wall part
12 Support part
13 Recessed part
14 Hollow part
31 Fin
e1 End point (Outside)
F Rotary tool
F2 Stirring pin
F4 Flat surface
F5 Projection
H1 First overlap part
H2 Second overlap part
K Table (Cooling plate)
WP Cooling path, Cooling pipe

The invention claimed is:

1. A method for manufacturing a liquid-cooling jacket, the liquid-cooling jacket including: a jacket body having a bottom part and a peripheral wall part standing on a periphery of the bottom part; and a sealing body to seal a recessed part of the jacket body, the jacket body and the sealing body together defining a hollow part in which heat transport fluid flows, the method comprising:
   an overlapping process in which the sealing body is placed on art end surface of the peripheral wall part in such a way that the end surface and a back surface of the sealing body are overlapped each other to form a first overlap part; and
   a primary joining process in which primary joining is performed by friction stirring, the primary joining process including inserting only a stirring pin provided to a rotary tool in the first overlap part from a front surface of the sealing body and moving the rotary tool once around the recessed part along the first overlap part in a state where only the stirring pin is in contact with the jacket body and the sealing body,
   wherein in the primary joining process, the rotary tool, which is provided with a flat surface orthogonal to a rotational axis of the stirring pin and a projection projecting from the flat surface at a tip part of the stirring pin, is employed, and the first overlap part is joined in a state where the flat surface is in contact with only the sealing body and a tip end of the projection is inserted more deeply than the first overlap part.

2. The method for manufacturing a liquid-cooling jacket according to claim 1, wherein a support part is provided on either one of the bottom part of the jacket body or the back surface of the sealing body and comes into contact with the other of the bottom part of the jacket body or the back surface of the sealing body.

3. The method for manufacturing a liquid-cooling jacket according to claim 1, wherein the jacket body is provided with a support part standing on the bottom part and to come into contact with the back surface of the sealing body, and
wherein in the primary joining process, in addition to friction stir welding to the first overlap part, friction stir welding is performed also to a second overlap part where the back surface of the sealing body and an end surface of the support part are overlapped each other.

4. The method for manufacturing a liquid-cooling jacket according to claim 3, wherein in the primary joining process, the second overlap part is joined in a state where the flat surface is in contact with only the sealing body and a tip end of the projection is inserted more deeply than the second overlap part.

5. The method for manufacturing a liquid-cooling jacket according to claim 4, wherein the support part is formed continuously with the peripheral wall part, and
wherein in the primary joining process, friction stir welding is performed to the first overlap part and to the second overlap part continuously.

6. The method for manufacturing a liquid-cooling jacket according to claim 4, wherein the support part is formed continuously with one wall part of the peripheral wall part and apart from another wall part facing the one wall part, and
wherein in the primary joining process, the rotary tool is inserted in the front surface of the sealing body at a position corresponding to the support pan, then friction stir welding is performed to the second overlap part and to the first overlap part continuously, and then the rotary tool is pulled out from the sealing body at an outer position than a plasticized region generated in the first overlap part.

7. The method for manufacturing a liquid-cooling jacket according to claim 1, wherein the jacket body is provided with a support part standing on the bottom part and to conic into contact with the back surface of the sealing body, the support part having a projection part on an end surface of the support part,
wherein the sealing body is provided with a hole part in which the projection part is inserted,
wherein in the overlapping process, the projection part is inserted in the hole part in such a way that a hole wall of the hole part and a side surface of the projection part are butted against each other to form a butting part and a second overlap part where the back surface of the sealing body and the end surface of the support part are overlapped each other, and
wherein in the primary joining process, in addition to friction stir welding to the first overlap part, friction stir welding is performed also to the second overlap part where the back surface of the sealing body and the end surface of the support part are overlapped each other and to the butting part where the hole wall of the hole part of the sealing body and the side surface of the projection part of the support part are butted against each other.

8. The method for manufacturing a liquid-cooling jacket according to claim 7, wherein in the primary joining process, as to friction stir welding to the butting part, the second overlap part and the butting part are each joined in a state where the flat surface is in contact with both of the jacket body and the sealing body, and the tip end of the projection is inserted more deeply than the second overlap part.

9. The method for manufacturing a liquid-cooling jacket according to claim 1, further comprising a repairing process in which a pull-up trace of the rotary tool is repaired by filling the pull-up trace with weld metal, the pull-up trace remaining on the front surface of the sealing body.

10. The method for manufacturing a liquid-cooling jacket according to claim 1, wherein in the primary joining process, a cooling plate is provided on the bottom part of the jacket body, and friction stir welding is performed while cooling the jacket body and the sealing body.

11. The method for manufacturing a liquid-cooling jacket according to claim 10, wherein a cooling path of the cooling plate, along which a cooling medium flows, has a plane shape at least along a moving locus of the rotary tool.

12. The method for manufacturing a liquid-cooling jacket according to claim 10, wherein a cooling path of the cooling plate, along which a cooling medium flows, is composed of a cooling pipe embedded in the cooling plate.

13. The method for manufacturing a liquid-cooling jacket according to claim 1, wherein in the primary joining process, friction stir welding is performed while letting a cooling medium flow in an inside of the jacket body to cool the jacket body and the sealing body.

14. The method for manufacturing a liquid-cooling jacket according to claim 1, wherein a plurality of fins are provided on at least either the bottom part of the jacket body or the back surface of the sealing body.

* * * * *